United States Patent [19]
Bond

[11] 4,041,284
[45] Aug. 9, 1977

[54] SIGNAL PROCESSING DEVICES USING RESIDUE CLASS ARITHMETIC

[75] Inventor: James W. Bond, San Diego, Calif.

[73] Assignee: The United States of America as represented by the Secretary of the Navy, Washington, D.C.

[21] Appl. No.: 720,915

[22] Filed: Sept. 7, 1976

[51] Int. Cl.² .............................................. G06J 1/00
[52] U.S. Cl. ................................. 235/150.5; 235/156; 235/181
[58] Field of Search ...................... 235/156, 152, 150.5, 235/150.53, 193, 181, 156; 340/347 DD, 347 DA, 347 AD

[56] References Cited

U.S. PATENT DOCUMENTS

| | | | |
|---|---|---|---|
| 3,167,645 | 1/1965 | Hoffmann et al. | 235/156 |
| 3,191,011 | 6/1965 | Baugh et al. | 235/156 |
| 3,609,328 | 9/1971 | Kieburtz | 235/156 |
| 3,980,874 | 9/1976 | Vora | 235/175 |

*Primary Examiner*—Joseph F. Ruggiero

*Attorney, Agent, or Firm*—Richard S. Sciascia; Ervin F. Johnston; John Stan

[57] ABSTRACT

Apparatus for performing arithmetical calculations on a plurality, N, of digital input signals, utilizing residue class arithmetic, comprising a plurality N of means for coding the N input digital signals into digital modulo $m_i$ integers, $K \leq i \geq 1$. $K$ may have a value of approximately 4. A plurality N of means, each means having an input connected to each coding means, converts the digital modulo $m_i$ integers into corresponding analog modulo $m_i$ signals. A plurality N of means performs a mathematical operation on the analog modulo $m_i$ integers, each means having an input connected to a D/A converting means. The means may be a multiplier or a correlator. A plurality N of means, connected to the N operation means, converts the analog modulo $m_i$ integers from the operation means into digital modulo $m_i$ integers. Means, connected to the N A/D converting means, decodes the digital modulo $m_i$ numbers into digital binary outputs.

8 Claims, 8 Drawing Figures

GENERAL DEVICE USING ANALOG AND DIGITAL COMPONENTS TO DO RESIDUE CLASS ARITHMETIC

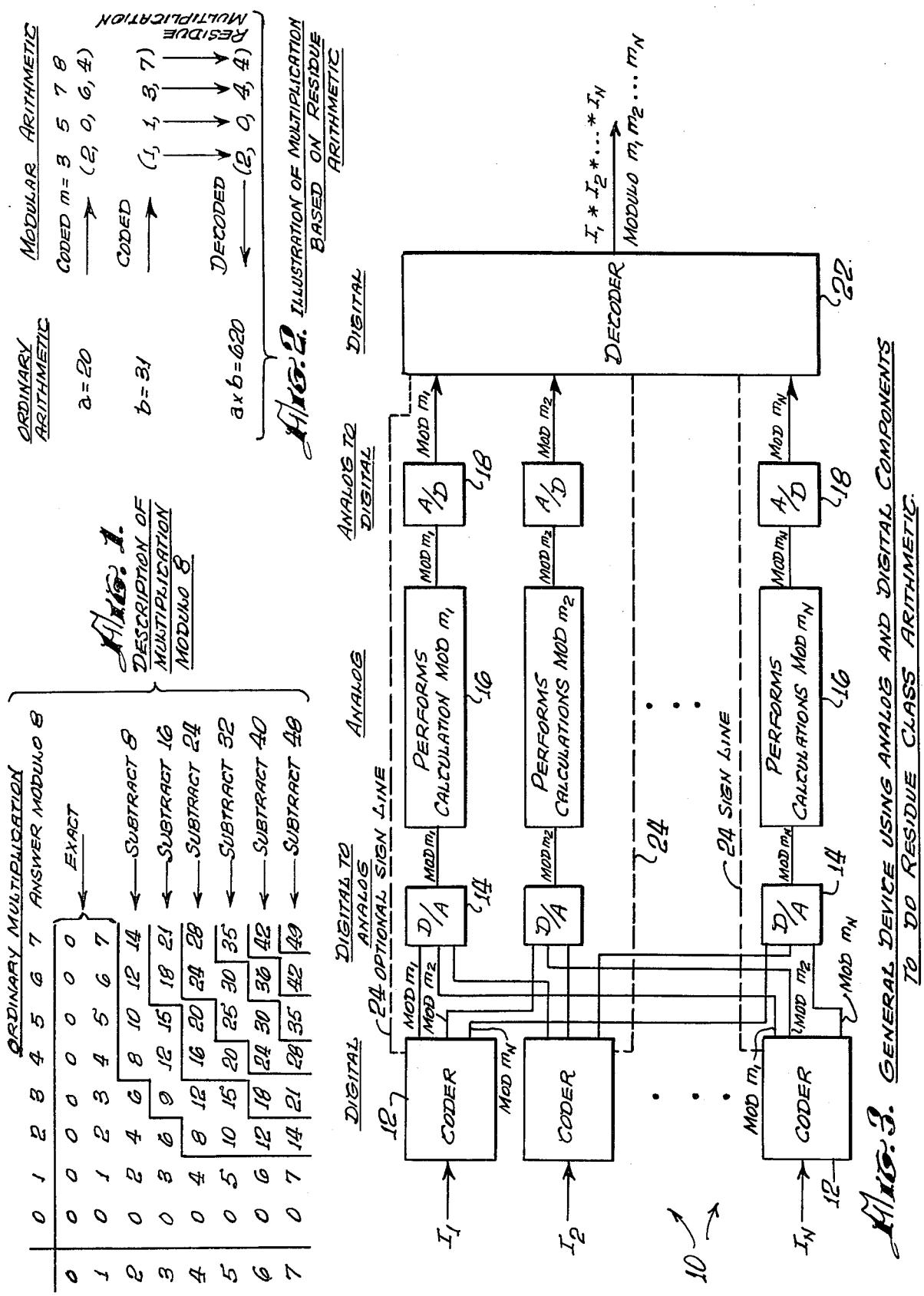

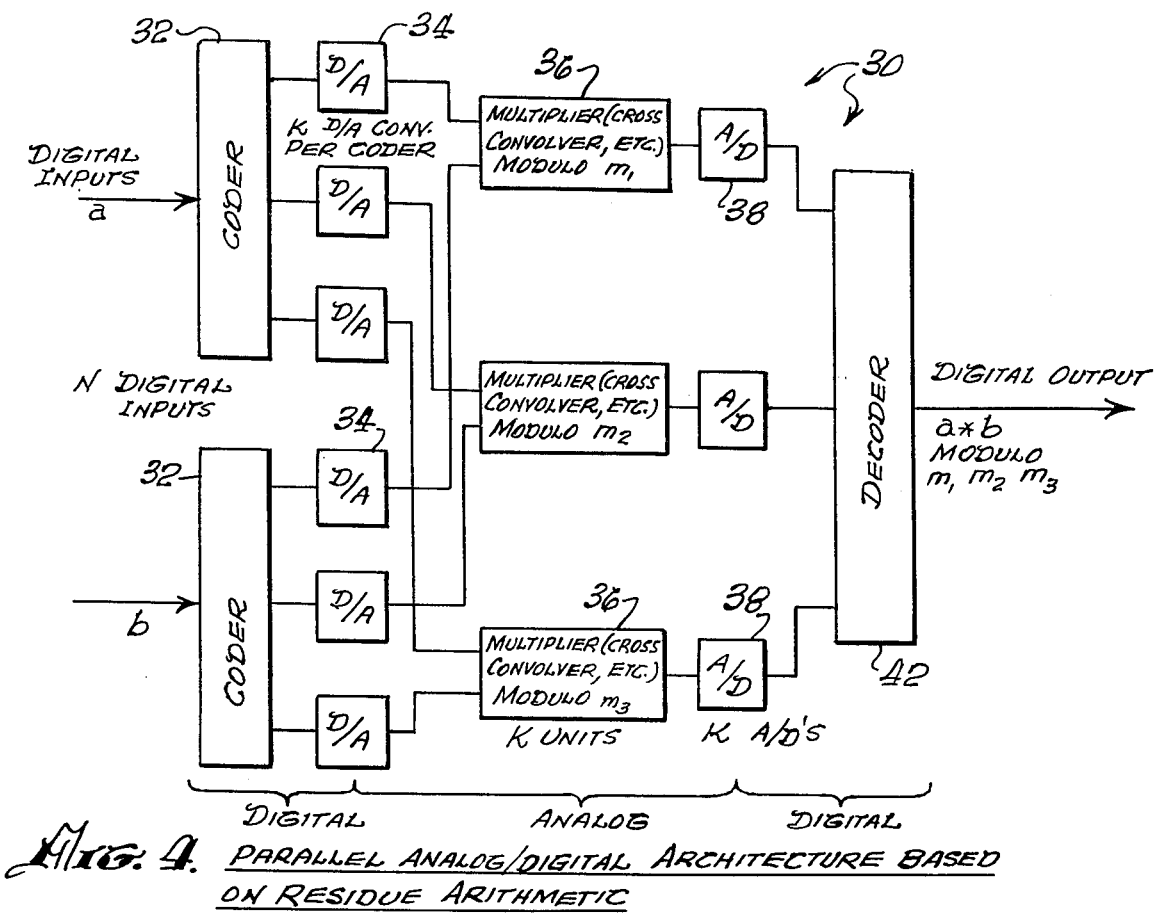
FIG. 4. PARALLEL ANALOG/DIGITAL ARCHITECTURE BASED ON RESIDUE ARITHMETIC
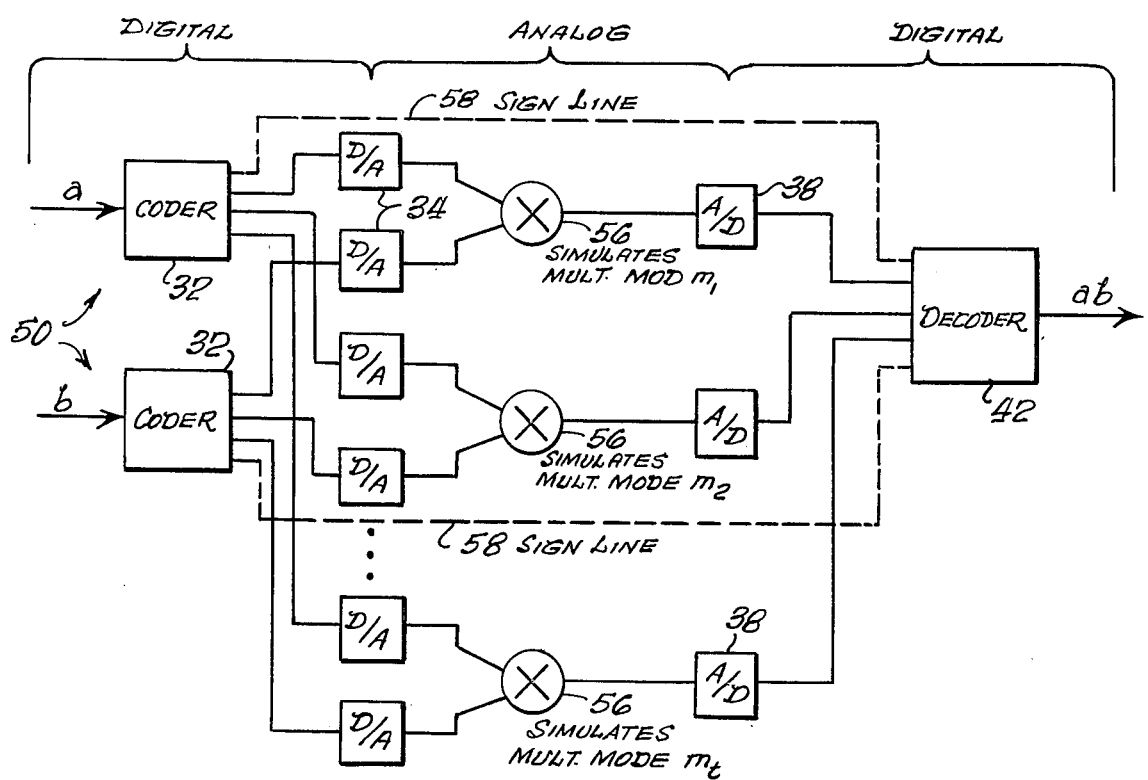
FIG. 5. MULTIPLIER BASED ON RESIDUE CLASS ARITHMETIC.

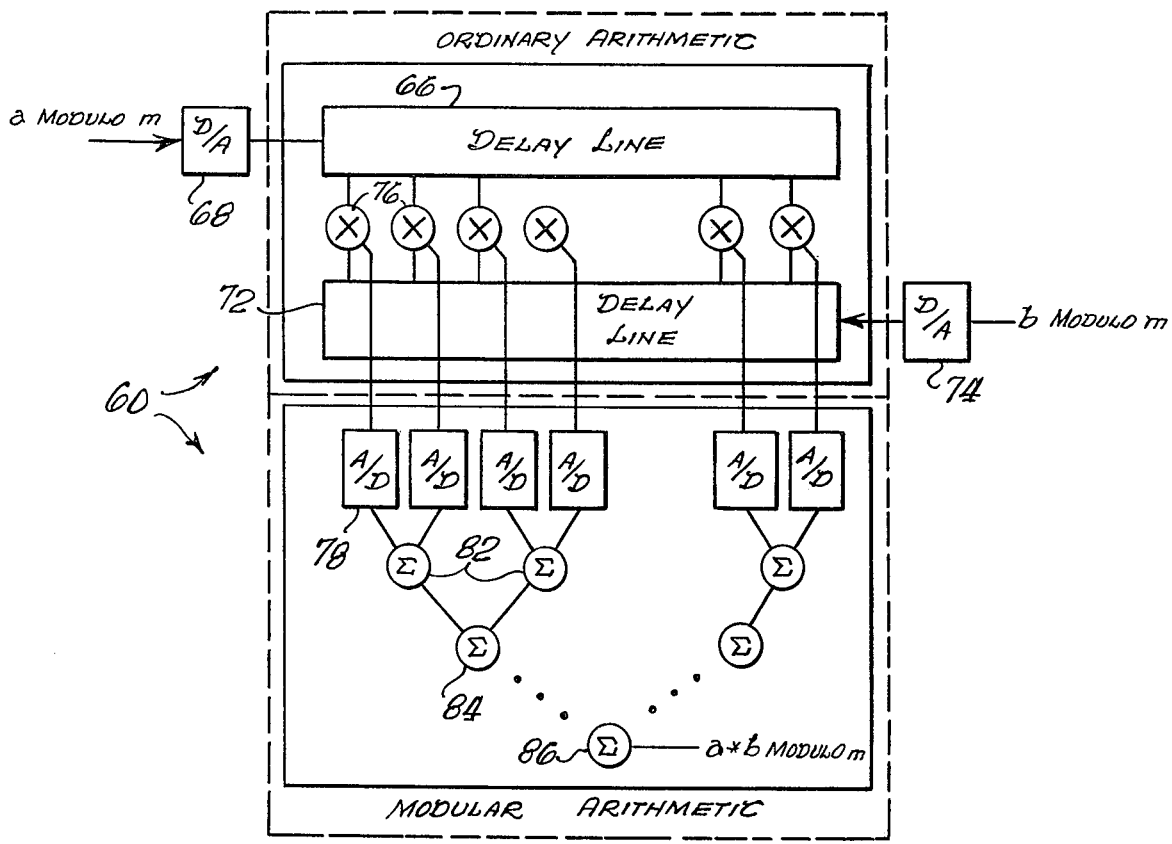
FIG. 6. MODULAR RESIDUE CLASS ARITHMETIC CROSS-CORRELATOR.
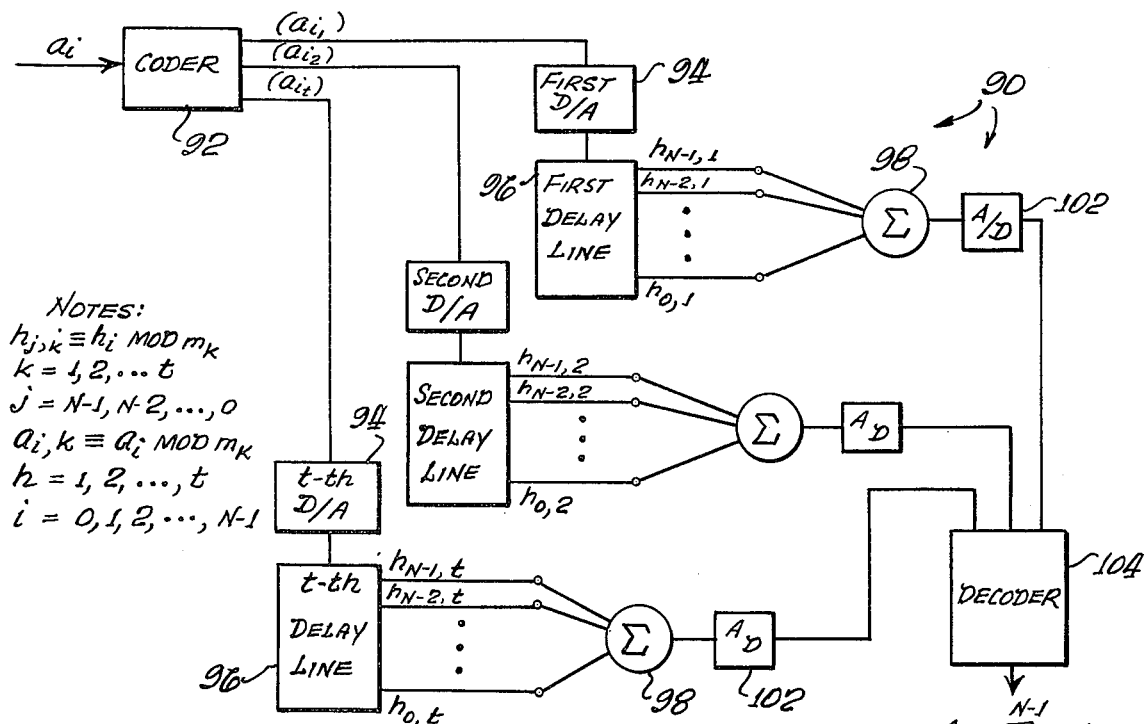
FIG. 7. TAPPED DELAY LINE DEVICE BASED ON RESIDUE CLASS ARITHMETIC, LEAST POSITIVE INTEGER.

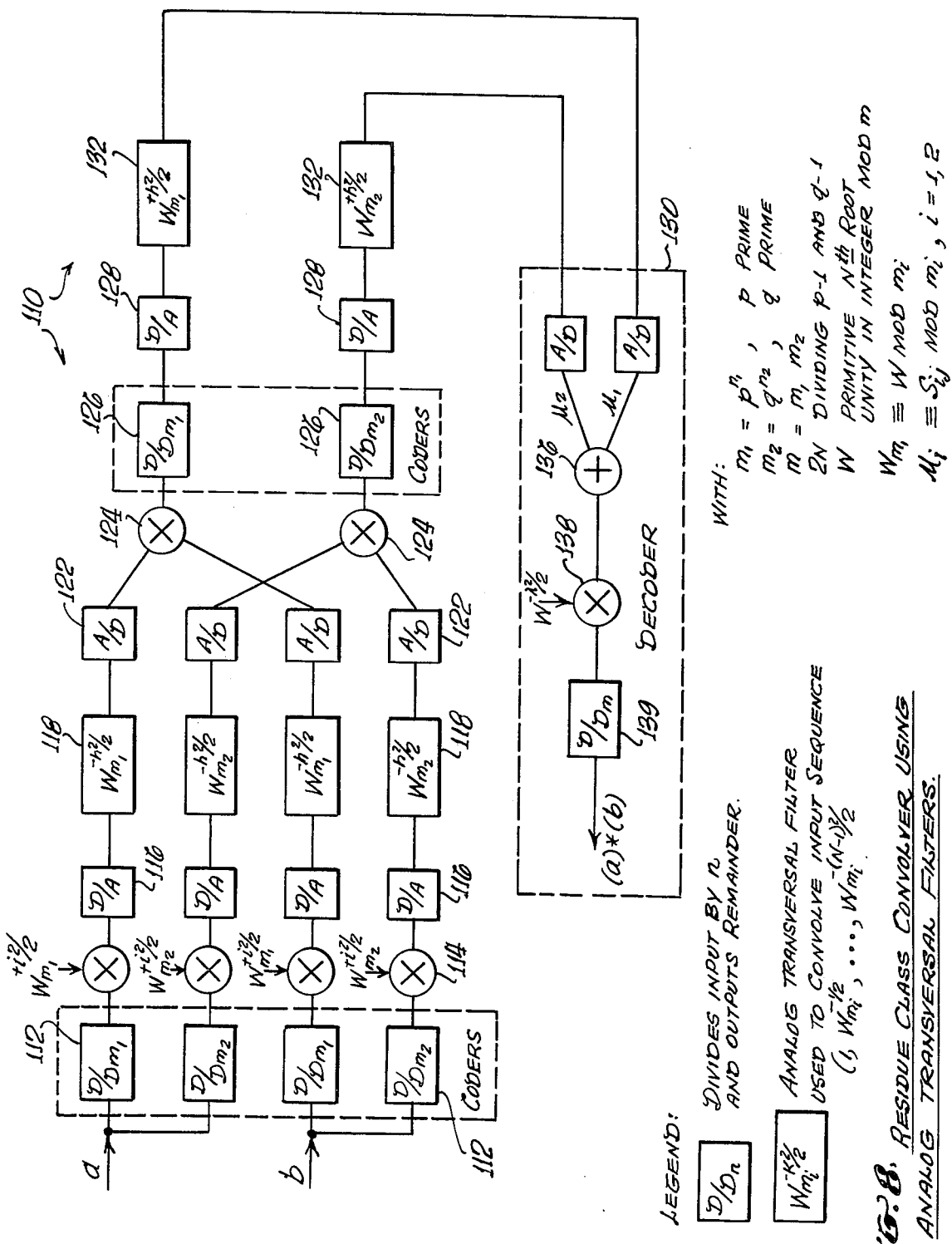

SIGNAL PROCESSING DEVICES USING RESIDUE CLASS ARITHMETIC

BACKGROUND OF THE INVENTION

Many signal processing systems require accurate multiplications, filtering, convolutions, and cross-correlations. Such applications include sonars, radars, frequency domain beamformers, and image-processing transform apparatus. The usefulness of very high-speed analog devices to perform these operations is often limited by the accuracy of the devices. This invention relates to the design of composite analog-digital devices consisting of several standard analog devices and digital residue class arithmetic coding and decoding devices to perform these operations in such a manner as to allow several orders of magnitude improvement in the accuracy achievable by using the composite device over the accuracy of the component analog devices.

In order to obtain increased accuracy, operations are ordinarily performed using all digital arithmetic. This results in a large number of logic gates being required to implement an accurate adder or multiplier. If a transversal filter were to be implemented by direct digital means, it would either require a vast number of logic gates or would have to use a small number of high speed multipliers, resulting in a loss of speed.

SUMMARY OF THE INVENTION

One embodiment of the invention has been described in the summary.

Another, slightly different version, of the invention comprises an apparatus for performing arithmetical calculations on a plurality, N, of digital input signals, utilizing residue class arithmetic.

A plurality N of means codes the N input digital signals into digital modulo $m_1$ integers, $K \geq i \geq 1$.

A plurality N of sets of means, one set connected to each coding means, K means per set, converts the digital modulo $m_1$ integers into corresponding analog modulo $m_1$ signals.

A plurality K of means performs a mathematical operation on analog modulo $m_1$ integers, each means having N inputs, one from, and connected to, each of the sets of the D/A converting means.

A plurality K of means are connected to the K operation means, for converting the analog modulo $m_1$ integers from the operation means into digital modulo $m_1$ integers.

Means are connected to the K A/D converting means, for obtaining the resultant, $a*b* \ldots *N$ modulo $m_1$, of the mathematical operations on the N digital inputs.

STATEMENT OF THE OBJECTS OF THE INVENTION

An object of the invention is to provide apparatus, using analog and digital components, which has equal accuracy to that obtainable when using only digital devices.

Another object of the invention is to provide apparatus, using residue arithmetic, in which the digital operations do not require taking into account carries of binary bits.

Yet another object of the invention is to provide apparatus which is an order of magnitude more accurate than similar analog-digital apparatus not utilizing residue arithmetic.

These and other objects of the invention will become more readily apparent from the ensuing specification when taken together with the drawings.

BRIEF DESCRIPTION OF THE DRAWINGS

FIG. 1 is a table showing multiplication modulo-8.

FIG. 2 is a diagram showing multiplication based on residue arithmetic.

FIG. 3 is a block diagram showing a general device using analog and digital components to perform residue class arithmetic.

FIG. 4 is a block diagram similar to that shown in FIG. 3, except utilizing a plurality of digital-to-analog converters for each coder.

FIG. 5 is a block diagram showing a specific implementation of the device shown in FIG. 4.

FIG. 6 is a detailed block diagram of one of the circuits, the circuit which performs modulo number calculations, shown in FIGS. 3 or 5.

FIG. 7 is a block diagram of a device using residue class arithmetic which includes a plurality of delay lines.

FIG. 8 is a block diagram of a residue class convolver using analog transversal filters.

DESCRIPTION OF THE PREFERRED EMBODIMENTS

Before describing the specific embodidments of the invention, some background information on residue class arithmetic will be discussed.

For each integer $m > 1$ there is a residue class arithmetic modulo $m$. In this arithmetic there are two types which will be the basis for the devices to be described: (1) least positive integer; and (2) least magnitude.

In type (1) the residue classes are $0, 1, 2, \ldots, m-1$, with the sum and product defined to be the ordinary integer sum and product reduced by an integer multiple of $m$ to one of the residue class values. In type (2) the residue classes are $0, \pm 1, \pm 2, \ldots, \pm(m-)/2$ when $m$ is an odd integer and $0, \pm 1, \pm 2, \ldots, \pm(m/2 - 1), +m/2$ when $m$ is an even integer, The basic fact about the integers modulo $m$ which will provide the improvements in accuracy for composite digital/analog devices over the accuracy of the component analog devices is that calculations in residue class arithmetic modulo $m$ can be reduced to doing calculations in the residue classes modulo $m_1$, modulo $m_2, \ldots,$ modulo $m_t$, whenever $m = m_1 m_2 \ldots m_t$ and the only common positive factor between $m_i$ and $m_j$ is the integer 1 whenever $i \neq j$. This fact is known as the Chinese Remainder Theorem.

More precisely, if $a$ and $b$ are any integers, let $a_m$, $b_m$ denote their residue classes modulo $m$ and $a_{m_i}$, $b_{m_i}$, denote their residue classes modulo $m_1$. Then there exist $u_1, \ldots, u_t$ (independent of $a$ and $b$) such that: ps $$a_m + b_m = u_1(a_{m_1} + b_{m_1}) + u_2(a_{m_2} + b_{m_2}) + \ldots + u_t(a_{m_t} + b_{m_t}) + hm$$

$$a_m b_m = u_1(a_{m_1} b_{m_1}) + \ldots + u_t(a_{m_t} b_{m_t}) + h^1 m$$

for some integers $h$ and $h^1$, which will depend on $a$ and $b$.

If $a$, $b$, $a+b$, and $a$ $b$ were all integers less than $m$, then $(a+b)_m = a_m = b_m$ and $(a \, b)_m = a_m b_m$ so that addition and multiplication in residue class arithmetic can be viewed as approximating integer arithmetic. For example, if analog devices could be provided to approximate $a_{m_1} + b_{m_1}, \ldots, a_{m_t} + b_{m_t}$ so that after analog to digital conversion $a_{m_i} + b_{m_i}$ could accurately be calculated with these devices, even though none of the devices by themselves could be used to calculate $a_m + b_m$ accurately.

Residue arithmetic has been considered by a number of authors for general purpose digital computers. An excellent book has been written to collect in one place this material. It is authored by N. S. Szabo and N. I. Tanaka, entitled Residue Arithmetic and its Applications to Computer Technology, and published by McGraw-Hill Book Company, 1967. Other useful references are: H. L. Garner, The Residue Number System, I.R.E. Transactions on Electronic Computers, pp. 140-147, June 1959; K. F. Gauss, Disquitiones Arithmetice, translated from Latin to English by Arthur J. Clarke, New Haven, Yale University Press, 1966; and J. W. Bond, A Characterization of Transforms with the Convolution Property for residue Class Rings, Naval Undersea Center, Internal Publication, TN 1518, July 1975.

Examples of using residue class arithmetic are illustrated in FIG. 1. Residue class arithmetic involves a finite number of elements, each consisting of an infinite set of ordinary integers. The residue class arithmetic modulo $m$ consists of $m$ disjoint sets of integers, called residue classes, [0], [1], . . . , [$m-1$]. Every integer belongs to the residue class labeled by its remainder after division by $m$. This is illustrated in FIG. 1.

Addition and multiplication of residue classes are defined in terms of ordinary addition and multiplication of the labels. If we let [$n$]denote the residue class containing $n$ then $[n] + [m] = [n + m]$ and $[n][m] = [nm]$ define addition and multiplication of residue classes. It is to be noted that the same classes are obtained when adding or multiplying, regardless of the labels chosen for the classes.

The largest product modulo $m$ has magnitude $(m-1)^2$. An accuracy of 1 part in $2[(m-1)^2+1]$ would be required if the multiplier were used to calculate this product to the nearest integer. In the example shown in FIG. 2, the following moduli are used: 3,5,7,8. Four multipliers could then be used to calculate products to 1 part in $3\cdot5\cdot7\cdot8=840$. FIG. 2 provides a schematic for the required calculations.

Referring now to FIG. 3, therein is shown an apparatus 10 for performing arithmetical calculations on a plurality, N, of digital input signals, utilizing residue class arithmetic.

A plurality N of means 12 codes the N input digital signals, $I_1$ through $I_N$, into digital modulo $m_1$ integers $K \leq i \geq 1$. The quantity $K$ may have an approximate value up to 4. The coding could be accomplished in two steps: First, assuming the input data to be binary, a digital magnitude reduction step, and second, a digital-to-analog conversion. The magnitude reduction may be illustrated by a binary 5 digit input to be converted to an analog multiplier for modulo 3. Then, because modulo 3 $[2^2] = [1], [1], [2^3] = [2], [2^4] = [1]$, etc., the number, $a_0 + 2a_1 + 4a_2 + 8a_3 + 16a_4$ is in the same class modulo 3 as $(a_0 + a_2 + a_4) + 2(a_1 + a_3)$.

A plurality N of means 14, each means having an input connected to each coding means 12, converts the digital modulo $m_1$ integers into corresponding analog modulo $m_1$ signals.

A plurality N of means 16 performs a mathematical operation on analog modulo $m_i$ integers, each means having an input connected to a D/A converting means 14.

A plurality N of means 18, connected to the N operation means 16, converts the analog modulo $m_i$ integers to digital modulo $m_i$ integers.

Means 22, connected to the N A/D converting means 18, decode the digital modulo $m_i$ numbers into digital outputs.

The decoding can be done digitally. It is based on the Chinese Remainder Theorem: Given $a_1, i = 1, \ldots, t$ there exists a unique integer $b$ with $0 < b < m_1 \ldots m_t$ and $[b] = [a_i]$ for residue classes modulo $m_i$ whenever the $m_i$ are pairwise relatively prime. Furthermore, there exists integers $n_1, n_2, \ldots, n_t$ which do not depend on the $a_i$, such that, $$[b] = [a_1 n_1 = a_2 n_2 + \ldots + a_t n_t].$$

There are various options to decode, discussed in the reference by Szabo and Tanaka, described hereinabove.

If the quantities moduli $m_i$ have different signs, then a sign line 24 may be connected between each coder 12 and the decoder 22.

In the apparatus 10 shown in FIG. 3, the means 16 for performing the mathematic operation may comprise a multiplier. In yet another embodiment of the apparatus 10 the means 16 for performing the mathematical operation may comprise a correlator.

The coders 12 and decoder 22 are digital state of the art. For example, if least positive integer representatives are being used as a basis for the device, and if $0 \leq a, b, \ldots, c \leq m-1$, then the coder 12 can be implemented by a read-only memory, since there is a one-to-one correspondence between the integers $0, 1, \ldots, m-1$ and the correspondence between the integers $0, 1, \ldots, m-1$ and the code words consisting of $(h_1, h_2, \ldots, h_t)$ with $0 \leq h_i \leq m_i - 1$ for $i = 1, \ldots, t$. If the outputs $(c_i)$ of the A/D converters 18 satisfy $0 \leq c_i \leq m_i - t$, then the decoder 22 can also be a read-only memory.

In FIG. 4 is shown another apparatus 30 for performing arithmetical calculations on a plurality, N, of digital input signals, utilizing residue class arithmetic.

A plurality N of means 32 codes the N input digital signals into digital modulo $m_i$ integers, $K \leq i \geq 1$.

A plurality N of sets of means 34, one set connected to each coding means 32, K means per set, converts the digital modulo $m_i$ integers into corresponding analog modulo $m_i$ signals.

A plurality K of means 36 performs a mathematical operation on analog modulo $m$ integers, each means having N inputs, one from, and connected to, each of the sets of the D/A converting means 34.

A plurality K of means 38 is connected to the K operation means 36, for converting the analog modulo $m_i$ integers from the operation means into digital modulo $m_i$ integers.

Means 42 are connected to the K A/D converting means 38, for obtaining the resultant, $a*b*\ldots N$ modulo $m_i$, of the mathematical operations on the N digital inputs.

In a more specific embodiment of the apparatus 30 shown in FIG. 5, the means for performing the mathematical operation may comprise a multiplier. This is shown by the apparatus 50 of FIG. 5, wherein the multiplier is designated by reference numeral 56.

In another type of apparatus 30, the means 36 for performing the mathematical operation may comprise a correlator.

Referring still to FIG. 5, therein is shown an analog multiplier 50 based on residue class arithmetic, with a least positive magnitude multiplier.

The output of the coder (ROM) 32 consists of pairs: one output (the magnitude) to the D/A converter 34, and thence to an analog multiplier 56, and the other output, the sign 58, to the decoder 42. The decoder (ROM) 42 then receives pairs of inputs consisting of residue class magnitudes and corresponding signs.

Example: Suppose an analog multiplier has 10% accuracy, i.e., if $a$ and $b$ are inputs the output $c$ differs from $ab$ by at most 0.1 $ab$. Let $m_1 = 3$, $m_2 = 4$, and $m_3 = 5$ and observe that a product of integers represented as least magnitude integers in $m_1$ is 1, in $m_2$ is 4, and $m_3$ is 4. Therefore the error in using an analog device to multiply two integers would be less than one-half, so that rounding the output to the nearest integers will give the correct answers modulo $m_i$.

The device 50 illustrated in FIG. 5, modified to use least magnitude representatives can determine the product of $ab$ to the nearest multiple of $m_1 m_2 m_3 = 60$. The inputs $a$ and $b$ to the coder 32 could each be as large as 59. The output of the device 50 would then provide the answer up to a multiple of 60. If the product of the inputs is less than 59 the output would be the product.

Suppose $a = 8$, $b = 6$, then, with $$m_1 = 3, m_2 = 4, m_3 = 5,$$

$$a_1 = -1, a_2 = 0, a_3 = -2, \text{ and}$$

$$b_1 = , b_2 = -2, b_3 = 1$$

so that the products obtained after A/D conversion would be 0, 0, 2 and the inputs to the coder 32 would be $(-, 0)$, $(-, 0)$, $(-, 2)$. The decoder 42 would in effect calculate $\pm (a_1 b_1)(-20) \pm (a_2 b_2)(-15) \pm (a_3 b_3)(-24)$, that is $(-0)(-20) + (-0)(-15) + (-2)(-24) = 48$.

Assume now that the multiplier 50 is a least positive integer multiplier. Suppose the analog devices, 34 and 38, have an accuracy of 2%. Then a product of integers modulo $m_i$ can have magnitude as large as $(m_i - 1)^2$. This follows because the modulus can have only the values of $0, 1, \ldots, m_i - 1$. The criterion for $m_i$ is that $(1/50)(m_i - 1)^2 < \frac{1}{2}$. i.e., $(m_i - 1)^2 < 25$, so that $m_i$ can only be 3, 4, and If in the apparatus 30 shown in FIG. 4, N is equal to two and the operation means 36 is a cross correlator, then the cross correlator 60 may be of the type shown in detail in FIG. 6.

A pair of delay lines, 62 and 64, having an even number $2^P$ of taps, one end of one delay line 66 being connected to a first D/A converting means 68, processes a first digital input signal, a modulo $m$. The opposite end of the other delay line 72 is connected to a second D/A converting means 74, which processes the second digital input signal, $b$ modulo $m$. It will be noted that both input signals, $a$ and $b$, are to the same modulus, namely $m$. Signals of different moduli could be handled sequentially, so long as both were of the same modulus, at the same time.

A plurality $2^P$, $P = 1, 2, 3, \ldots$ of means 76 for multiplying, whose two inputs comprise corresponding outputs of the delay lines, 66 and 72, multiplies its two input signals.

A set of $\frac{1}{2}(2^P)$ pairs of analog-to-digital converting means 78, each means connected to the output of the multipliers 76, converts an analog modulo-$m$ input number into a digital modulo-$m$ output number.

A first set of $\frac{1}{2}(2^P)$, means 82 is connected to the outputs of the converting means, for summing the digital modulo $m$ input signals. A second set of $\frac{1}{4}(2^P)$ means 84, each means having its two inputs connected to the first set of summing means 82, sums its digital input signals.

A third, fourth, $\ldots$, set of $\frac{1}{8}(2^P)$, $1/16(2^P)$, $\ldots$, means, not shown in the figure, may be included, each means having its two inputs connected to one of the preceding pairs of summing means, until there remains one summing means 86, at the output of which appears $a*b$ modulo $m$, the * symbol indicating cross correlation, for the embodiment 60.

Referring now to FIG. 7, therein is shown an apparatus 90 for performing arithmetric calculations on a plurality of sequential digital input signals $a_i$, $i = 0, 1, 2, \ldots, N-1$, utilizing residue class arithmetic. A means 92 is included for coding the input digital signal into digitial $a_i$ modulo $m_k$ integers, $k = 1, 2, \ldots, t$. The quantity $t$ may have a value in the range of 100.

A plurality N of means 94, each means having its input connected to the coding means 92, converts the digital $a_i$ modulo $m_k$ integers into corresponding analog $a_i$ modulo $m_k$ signals.

A plurality $t$ of means 96 delays the analog modulo $m_k$ signals, each means having an input connected to a D/A converting means 94, each delaying means having N outputs, $h_l$ mod $m_k$.

A plurality $t$ of means 98 is connected to the delaying means 96, for summing the outputs of the delaying means.

A plurality $t$ of means 102 is connected to the $t$ summing means 98, for converting the analog $a_i$ modulo $m_k$ integers from the summing means into digital $a_i$ modulo $m_k$ integers.

Means 104 are connected to the $t$ A/D converting means 102, for decoding the digital $a_i$ modulo $m_k$ numbers into a digital output, $$A_l = \sum_{i=0}^{N-1} a_i k_{j-i}.$$

FIG. 7 presents a block diagram for a tapped delay line device 90 using residue class arithmetic. The weights for the delay lines 96 can be chosen as all non-negative integers by using least positive integers representatives (e.g., when the tapped delay line is a charge-coupled device) for the residue class arithmetic.

The complexity of the digital coder 92 and decoder 102 is independent of N, where N is the number of taps in the filter, or delay line 96. The D/A 94, and A/D, 102, complexity depends on the modulii $m_i$ and not on the quantity N. The maximal accuracy achievable for the device 90 depends on the number of pairwise relatively prime moduli $m_i$ which may be used. The tap weights $h_j, i$ in the delay line 96 to calculate modulo $m_i$ will have at most $m_i$ values and the inputs can be restricted to have at most $m_i$ distinct values.

Suppose the tapped delay lines 96 were surface wave devices so that the taps could be positive or negative. Suppose that $N = 5$ and $h_0 = 1$, $h_1 = 2$, $h_2 = 6$, $h_3 = 2$, $h_4 = 1$. For $m_1 = 7$: $h_{0,1} = 1 \mod 7 = 1$, $h_{1,1} = 2$, $h_2, 1$ 6 mod 7 = 1, $h_{3,1} = 2$, $h_{4,1} = 1$ and $$\sum_{i=0}^{N-1} a_{i,1} h_{i,1} \leq 36 = \sum_{m \text{ positive}} - \sum_{m \text{ negative}} \leq \sum_{m \text{ positive}}$$

The $a_{i,1}$ term refers to inputs $a_i \bmod m_i$. The term to the right of the inequality sign $\leq$ designates the maximum possible value of the term in the brackets for the values of $h_{i,l}$ as determined in the equations immediately above the inequality term.

$m_2 = 9: h_{0,2} = 1 \bmod 9 = 1, h_{1,2} = 2$ $h_{2,2} = -3, h_{3,2} = 2, h_{4,2} \qquad = 1$ $$\left| \sum_{i=0}^{N-1} a_{i,2} h_{i,2} \right| \leq 48,$$

where $a_{i,2}$ stands for inputs $a_i \bmod m_2$ $m_3 = 5: h_{0,3} = 1, h_{1,3} = 2, h_{2,3} = 1, h_{3,3} = 2, h_{4,3} = 1$
and $$\left| \sum_{i=0}^{N-1} a_{i,3} h_{i,3} \right| \leq 28$$

$m_4 = 8: h_{0,4} = 1, h_{1,4} = 2, h_{2,4} = -2, h_{3,4} = 2, h_{4,4} = 1$ and $$\left| \sum_{i=0}^{N-1} a_{i,4} h_{i,4} \right| \leq 48$$

Therefore if the delay line 96 gave 1% accuracy, the outputs could be decoded to an accuracy of 1 part in $(7)(9)(5)(8) = 2520$. In this case the decoder 104 would be built to associate the residue modulo 2520 of $c_1(-720) + c_2(280) + c_3(-504) + c_4(945)$ to the inputs $c_1, c_2, c_3,$ and $c_4$. These terms may be derived by use of the Chinese Remainder Theorem.

FIG. 8 is a block diagram for a residue class convolver 110 using tapped delay lines, 118 and 132. The structure 110 is based upon a generalization of the chirp-z transform to residue class arithmetic. The rationale of this transformation for arithmetic modulo $m$ is that 2N, N being the block length, divides $p - 1$ for every prime $p$ dividing $m$.

Suppose $m_1 = p_1^{n_1}, ..., m_t^{n_t}$ with $p_1, ..., p_t$ being distinct primes and $m = m_1 m_2 ... m_t$. Then there exists an integer $w$ in the integers modulo $m$ such that $w^N \equiv 1 \bmod m$ and $w^{d-1}$ is not divisible by a $p_i$ for $1 \leq d \leq N - 1$. Then $w_{mi} \equiv w \bmod m_i$ and can be taken so that $0 \leq w_{m_l} \leq m_i - 1$.

FIG. 8 illustrates an alternate approach to coding and decoding than the use of read-only-memories.

Example (N = 3) $m_1 = 7, m_2 = 13, m_3 = 19$
$w_{m_1} = 2, w_{m_2} = 3, w_{m_3} = 7$
Then the weight vectors are:

$w_{m_1^+}{}^{h^2/2} = (1, +3, -3, -3, +3)$ $w_{m_1^-}{}^{h^2/2} = (1, -3, +3, +3, -3)$ $w_{m_2^+}{}^{h^2/2} = (1, +4, -4, -4, +4)$ $w_{m_2^-}{}^{h^2/2} = (1, -4, +4, +4, -4)$ $w_{m_3^+}{}^{h^2/2} = (1, 8, -8, -8, 8)$ $w_{m_3^-}{}^{h^2/2} = (1, -8, 8, 8, -8)$

The terms in brackets describe the $2N - 1 = 5$ tap weights of the nine delay lines. The input sequences ($a_0, a_1, a_2$) are premultipled and extended by available discrete multipliers, to form:

| | |
|---|---|
| $(a_{0,1}, 3a_{1,1}, -3a_{2,1}, 0, 0)$ | after D/A conversion the input sequence to |
| $(b_{0,1}, 3b_{1,1}, -3b_{2,1}, 0, 0)$ | the two delay lines with tap weights $(1, -3, 3, 3, -3)$. |
| $(a_{0,2}, 4a_{1,2}, -4a_{2,2}, 0, 0)$ | after D/A conversion the input sequence to |
| $(b_{0,2}, 4b_{1,2}, -4b_{2,2}, 0, 0)$ | the two delay lines with tap weights $(1, -4, 4, 4, -4)$. |
| $(a_{0,3}, 8a_{1,3}, -8a_{2,3}, 0, 0)$ | after D/A conversion the two input |
| $(b_{0,3}, 8b_{1,3}, -8b_{2,3}, 0, 0)$ | sequences to the two delay lines with tap weighs $(1, -8, 8, 8, -8)$. |

The first three outputs of the delay line after the line is loaded are used, the next two are discarded, since they have no meaning. The corresponding outputs from the $a$ filter and $b$ filter are point-to-point multiplied, extended by two zeros to form the sequences to go through the next delay line. For example, the delay line associated with $a$ and $m_1$ is used to calculate $(a_{0,1}, 3a_{1,1}, -3a_{2,1}, 0, 0) * (1, -3, 3, 3, -3) = (a_{0,1} - 9a_{1,1} - 9a_{2,1}, -3a_{0,1} + 9a_{1,1} - 9a_{2,1}, 3_{3,0} + 9a_{1,1} + 9a_{2,1}, *, *)$ which is replaced by $(a_{0,1} - 9a_{1,1} - 9a_{2,1}, -3a_{0,1} + 9a_{1,1} - 9a_{2,1}, 3a_{0,1} + 9a_{1,1} + 9a_{2,1}, 0, 0)$.

The multiplier 124 point-wise multiplies this sequence with the corresponding sequence $(b_{0,1}, 3b_{1,1}, -3b_{2,1}, 0, 0) * (1, -3, 3, 3, -3)$ to form $((a_{0,1} - 9a_{1,1} - 9a_{2,1})(b_{0,1} - 9b_{1,1} - 9b_{2,1}),$ $(-3_{0,1} + 9a_{1,1} - 9a_{2,1})(-3b_{0,1} + 9b_{1,1} - 9b_{2,1}), (+3a_{0,1} + 9a_{1,1} + 9a_{2,1})(3b_{0,1} + 9b_{1,1} + 9b_{2,1})$ The terms in this sequence are reduced modulo $m$, converted to analog, in circuit 128, and sent into the delay line 132 with taps weights $(1, 3, -3, -3, 3)$. The results are converted to digital, in circuit 134, multiplied by constants $u_1, u_2, u_3$ and multiplied by $w$ and reduced modulo $m = m_1 m_2 m_3$. The values of $u_i$ are given by $u_1 = -741 \qquad u_2 = -532 \qquad u_3 = 91,$ which are found by the Chinese Remainder Theorem, and $w \equiv u_1 w_{m1} + u_2 w_{m2} + u_3 w_{m3} \bmod m_1 m_2 m_3,$ so that $w = -712$ The tapped delay lines, 118 and 132, could be implemented by charge-coupled devices. The tap weights must be non-negative, but by using right and left taps, positive weights on one bar and negative on the other, the device 110 output magnitude can be held to those described above. Positive weights can also be utilized on both sides if only positive tap weights are needed, as for $w_{m_3^+}{}^{h^2/2}$ in the example.

By introducing zeros in both the input sequences and the sequence of tap weights, convolution sums from a tapped delay line can be calculated by summing or differencing two or more smaller sums. In this way the accuracy requirements on the charge-coupled device can be reduced.

The advantages of the inventions described hereinabove are they they utilize devices with given accuracy to perform calculations of higher accuracy. The performance of a high accuracy calculation by digital components involving a high complexity is replaced by a number of A/D and D/A converters each with a low complexity. One new feature is to use analog devices to perform residue class arithmetic. Others have used analog devices to do integer calculations, but none have conceived reducing desired integer calculations to simpler residue arithmetic calculations.

As alternative embodiments the chirp-Z transform (CZT) architecture invention could be modified to implement the Rader prime transformation, by replacing the premultiplication and post multiplication in FIG. 8 by memories to reorder the data.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for performing arithmetical calculations on a plurality, N, of digital input signals, utilizing residue class arithmetic, comprising:
   a plurality N of means for coding the N input digital signals into digital modulo $m_i$ integers, $K \leq i \geq 1$;
   a plurality N of means, each means having an input connected to each coding means, for converting the digital modulo $m_i$ integers into corresponding analog modulo $m_i$ signals;
   a plurality N of means for performing a mathematical operation on analog modulo $m_i$ integers, each means having an input connected to a D/A converting means;
   a plurality N of means, connected to the N operation means, for converting the analog modulo $m_i$ integers from the operation means into digital modulo $m_i$ integers; and
   means, connected to the N A/D converting means, for decoding the digital modulo $m_i$ numbers into digital outputs.

2. The apparatus according to claim 1, wherein:
   the means for performing the mathematical operation comprises a multiplier.

3. The apparatus according to claim 1, wherein:
   the means for performing the mathematical operation comprises a correlator.

4. Apparatus for performing arithmetical calculations on a plurality, N, of digital input signals, utilizing residue class arithmetic, comprising:
   a plurality N of means for coding the N input digital signals into digital modulo $m_i$ integers, $K \leq i \geq 1$;
   a plurality N of sets of means, one set connected to each coding means, K means per set, for converting the digital modulo $m_i$ integers into corresponding analog modulo $m_i$ signals;
   a plurality K of means for performing a mathematical operation on analog modulo $m$ integers, each means having N inputs, one from, and connected to, each of the sets of the D/A converting means;
   a plurality K of means, connected to the K operation means, for converting the analog modulo $m_i$ integers from the operation means into digital modulo $m_i$ integers; and
   means, connected to the K A/D converting means, for obtaining the resultant, $a*b*\ldots*n$ modulo $m_i$, of the mathematical operations on the N digital inputs.

5. The apparatus according to claim 4, wherein:
   the means for performing the mathematical operation comprises a multiplier.

6. The apparatus according to claim 4, wherein:
   the means for performing the mathematical operation comprises a correlator.

7. The apparatus according to claim 4, wherein N is equal to two and the correlator is a cross correlator comprising:
   a pair of delay lines each having an even number $2^P$ of taps and outputs, one end of one delay line being connected to a first D/A converting means, which processes a first digital input signal, a modulo $m$, the opposite end of the other delay line being connected to a second D/A converting means, which processes the second digital input signal, $b$ modulo $m$;
   a plurality $2^P$ of means for multiplying, whose two inputs comprise corresponding outputs of the delay lines, for multiplying its two input signals;
   a set of pairs of analog-to-digital converting means, each means connected to the output of a multiplier, for converting an analog modulo-$m$ input number into a digital modulo-$m$ output number;
   a first set of $\frac{1}{2}2^P$, $O=1, 2, 3, \ldots$, means connected to the outputs of the converting means, for summing the digital modulo $m$ input signals;
   a second set of $\frac{1}{4}(2^P)$ means, each means having its two inputs connected to two of the first set of summing means, for summing its digital input signals;
   a third, fourth, $\ldots$, set of $1/8(2^P)$, $1/16(2^P)$, $\ldots$, means, each means having its two inputs connected to one of the preceding pairs of summing means, until there remains one summing means, at the output of which appears $a*b$ modulo $m$.

8. Apparatus for performing arithmetical calculations on a plurality of digital input signal $a_i$, $i=0, 1, 2, \ldots$, N-1, utilizing residue class arithmetic, comprising:
   a means for coding the input digital signal into digital $a_i$ modulo $m_k$ integers, $k = 1, 2, \ldots, t$;
   a plurality N of means, each means having an input connected to the colding means, for converting the digital $a_1$ modulo $m_k$ integers into corresponding analog $a_l$ modulo $m_k$ signals;
   a plurality $t$ of means for delaying the analog $a_i$ modulo $m_k$ integers, each means having an input connected to a D/A converting means, each delaying means having N outputs, $h_i$ mod $m_k$;
   a plurality $t$ of means, connected to the delaying means, for summing the outputs of the delaying means;
   a plurality $t$ of means, connected to the $t$ summing means, for converting the analog $a_i$ modulo $m_k$ integers from the summing means into digital $a_i$ modulo $m_k$ integers; and
   means, connected to the $t$ A/D converting means, for decoding the digital $a_i$ modulo $m_k$ numbers into a digital output, $$a_i = \sum_{i=0}^{N-1} a_i k_{j-i}$$

* * * * *